United States Patent Office 3,312,730
Patented Apr. 4, 1967

3,312,730
INDENYL ACIDS AND DERIVATIVES THEREOF
Charles A. Winter, Box 143, Blue Bell, Pa. 19422, and Tsung-Ying Shen, 728 Tamaques Way, Westfield, N.J. 07090
No Drawing. Original application May 6, 1963, Ser. No. 278,390. Divided and this application Sept. 14, 1965, Ser. No. 498,181
10 Claims. (Cl. 260—473)

This application is a division of our copending application Ser. No. 278,390, filed May 6, 1963.

This invention relates to a new method of treating inflammation and to a preferred class of new compounds of the indene series for such treatment. More specifically, it relates to the treatment of inflammation with $\alpha$-(1-aralkylidene or heteroaralkylidene-3-indenyl) lower aliphatic acids and their salts, amides and esters. More specifically also, it relates to the treatment of inflammation with compounds of the formula:

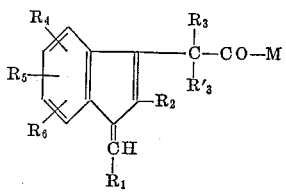

in which $R_1$ may be aryl or heteroaryl;
$R_2$ may be hydrogen, alkyl, aralkyl, aryl, heteroaryl, halogen, hydroxy, alkoxy, haloalkyl, alkylthio and arylthio;
$R_3$ may be hydrogen, lower alkyl, halogeno lower alkyl, fluorine, amino, acylamino, dialkylamino, N-morpholino, alkenyl, aralkylthio, hydroxy and alkoxy and together with $R_3'$ a methylene;
$R_3'$ is hydrogen or together with $R_3$ a methylene;
$R_4$, $R_5$ and $R_6$ each may be hydrogen, alkyl, alkoxy, nitro, amino, acylamino, alkylamino, dialkylamino, dialkylaminoalkyl, sulfamyl, alkylthio, mercapto, alkylsulfonyl, arylsulfonyl, halogen, cyano, carboxyl, carbalkoxy, carbamido, aryl, halogenoalkyl, alkenyloxy, aralkyloxy, alkenyl, aryloxy, cycloalkyl and cycloalkyloxy, and
M may be hydroxy, lower alkoxy, substituted lower alkoxy, amino, alkylamino, dialkylamino, N-morpholino, hydroxyalkylamino, polyhydroxyalkylamino, dialkylaminoalkylamino, aminoalkylamino, and the group OMe in which Me is a cation as well as the 2,3-dihydro derivatives of said compounds.

More specifically, also, in a separate and distinct aspect, this invention relates to a preferred new class of compounds especially useful as antiinflammatory agents, having the formula:

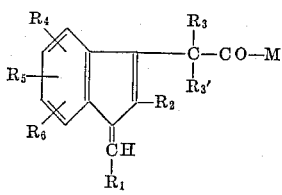

in which $R_1$ is aryl or heteroaryl, having at least one functional substituent;
$R_2$ is alkyl, aralkyl, aryl, heteroaryl, halogen, hydroxy, alkoxy, haloalkyl, alkylthio and arylthio;
$R_3$ is hydrogen, lower alkyl, halo lower alkyl, fluorine, amino, acylamino, dialkylamino, N-morpholino, alkenyl, aralkylthio, hydroxy, alkoxy and together with $R_3'$ a methylene;

$R_3'$ is hydrogen or together with $R_3$ a methylene;
$R_4$ is alkyl, alkoxy, nitro, amino, acylamino, alkylamino, dialkylamino, dialkylaminoalkyl, sulfamyl, alkylthio, mercapto, alkylsulfonyl, arylsulfonyl, halogen, cyano, carboxyl, carbalkoxy, carbamido, aryl, halogenoalkyl, alkenyloxy, aralkyloxy, alkenyl, aryloxy, cycloalkyl and cycloalkyloxy;
$R_5$ and $R_6$ are hydrogen or any of the groups defining $R_4$; and
M is hydroxy, lower alkoxy, substituted lower alkoxy, amino, alkylamino, dialkylamino, N-morpholino, hydroxyalkylamino, polyhydroxyalkylamino, dialkylaminoalkylamino, aminoalkylamino, and the group OMe, in which Me is a cation;
as well as the 2,3-dihydro derivatives of said compounds.

The compounds of the above description, especially those of the preferred class in which the aryl or heteroaryl group represented by $R_1$ has at least one functional substituent and in which both $R_2$ and $R_4$ are other than hydrogen, possess a high degree of anti-inflammatory activity. They are highly active and are of value in the treatment of arthritic and dermatological disorders and like conditions responsive to anti-inflammatory drugs. They also possess a useful degree of anti-pyretic activity. More important, these compounds possess these beneficial activities with only a small fraction of the ulcerogenic side effect which is so characteristic of most anti-inflammatory drugs. The ulcerogenic effect is found in these compounds to be greatly reduced and in many cases just about completely eliminated. These compounds can be administered orally in capsules or may be applied topically or intravenously. The dosage in each case will depend on the specific compound and the type and severity of the infection. For the present compounds, dosages of the order of 10 to 2000 mg. per day may be used for arthritic conditions, depending on the activity of the compound and the reaction sensitivity of the patient.

The compounds used in the method of our invention are $\alpha$-(1-aralkylidene or heteroaralkylidene-3-idenyl) aliphatic acids. Especially, they are compounds of the formula given above. The substituents on the 1-position are aralkylidene or heteroaralkylidene groups derived from aromatic or heterocyclic aromatic aldehydes. In the preferred class of compounds which form a separate aspect of this invention, these aldehyde carry at least one functional substituent, preferably in the para position. The term functional substituent means one other than hydrogen or alkyl, i.e., one whose polariy and general character affects the electron distribution in the aryl or heteroaryl group, causing activation of some positions and/or inactivation of others. On the 2-position of the indene nucleus, one can place a number of substituents such as alkyl, aralkyl, aryl, alkoxy, arylthio, nitro, amino, dialkylamino, etc. or the 2-position may be unsubstituted, in which case $R_2$ becomes hydrogen. In the preferred class, which forms a separate aspect of the invention, $R_2$ must be other than hydrogen.

Since these compounds are 3-indenyl aliphatic acids, the 3-position must have an aliphatic acid side chain with the indenyl nucleus on the alpha carbon of the aliphatic acid. Normally, one has an acetic or propionic acid side chain, but other lower aliphatic acid side chains such as $\beta,\beta,\beta$-trifluoro-$\alpha$-indenyl propionic acids, alkenoic acids and higher alkanoic acids as well as other aliphatic acids such as cyclopropane carboxylic acids can be equally well used. In addition, contemplated within the scope of this invention are 3-indenyl glycines and N-alkyl-3-indenylglycines. In such compounds the acetic acid side chain carries in the $\alpha$-position an amino or dialkylamino group. They are prepared by the reaction of hydroxylamine on the corresponding 3-indenylglyoxylate (from the 3-unsubstituted indene and oxalyl chloride followed by esterification) and reduction of the oxime. The unsubstituted α-amino group may be alkylated by any good alkylating agent, such as dialkyl sulfate or alkyl halides.

The benzene ring of the indene nucleus may carry from one to three substituents of a number of types, preferably alkyl, alkoxy, nitrogen and sulfur derivatives or various carboxylic acid functional derivatives as enumerated above and described further below. In the case of the preferred compounds which form a separate aspect of this invention, there must be such a substituent. Preperably, the 5-position of the indene should be substituted. Not only the free acids, but the esters, amides and salts are included within the scope of this invention.

In the preparation of the compounds used in the method of this invention, the starting material is a β-aryl propionic acid. This is prepared according to the scheme shown in Flow Sheet I. Note that $R_4$, $R_5$ and $R_6$ in this Flow Sheet do not have as extensive a definition as in the definition of the compounds included in our invention. The reason for this is that it is very easy to make a large number of these other substituted indenes from the nitro indenes. In the preparation described in Flow Sheet I, several alternative routes can be used. Thus, a substituted benzaldehyde may be condensed with a substituted acetic ester in a Claisen reaction or with an α-halogeno propionic ester in a Reformatsky Reaction. The resulting unsaturated ester is reduced and hydrolyzed to give the benzyl propionic acid starting material. Alternatively, a substituted malonic ester in a typical malonic ester synthesis and acid hydrolysis of the resulting substituted ester yields the benzyl propionic acid directly. This latter method is especially preferable for nitro and alkylthio substituents on the benzene ring.

Equivalents:
  X=halogen, usually Cl or Br.
  E=esterifying group, usually methyl, ethyl or benzyl.
  $R_2$=H, alkyl, halogenated alkyl, aralkyl, aryl and heteroaryl.
  $R_4$, $R_5$ and $R_6$=H, alkyl, alkoxy, nitro, alkylthio, alkylsulfonyl, arylsulfonyl, halogenoalkyl, etc. as defined on Page 1, at least one not being H.

Reagents:
  ① Zn dust in anhydrous inert solvent such as benzene and ether.
  ② $KHSO_4$ or p-toluene sulfonic acid.
  ③ $NaOC_2H_5$ in anhydrous ethanol at room temperature.
  ④ $H_2$, palladium on charcoal, 40 p.s.i. room temperature.
  ⑤ NaOH in aqueous alcohol at 20–100°.
  ⑥ $NaOC_2H_5$ or any other strong base such as NaH or K-t-butoxide.
  ⑦ Acid.

(I) *Preparation of β-arylpropionic acid starting materials*

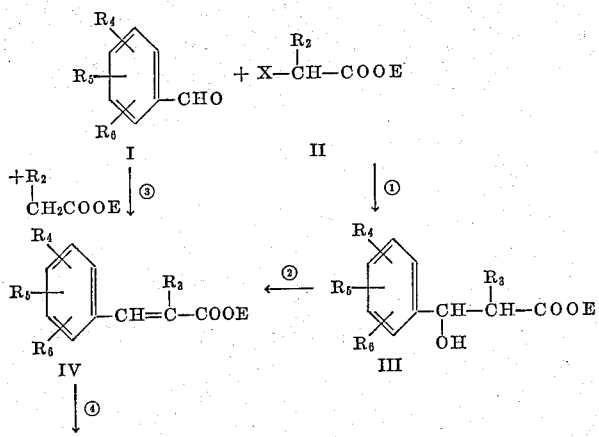

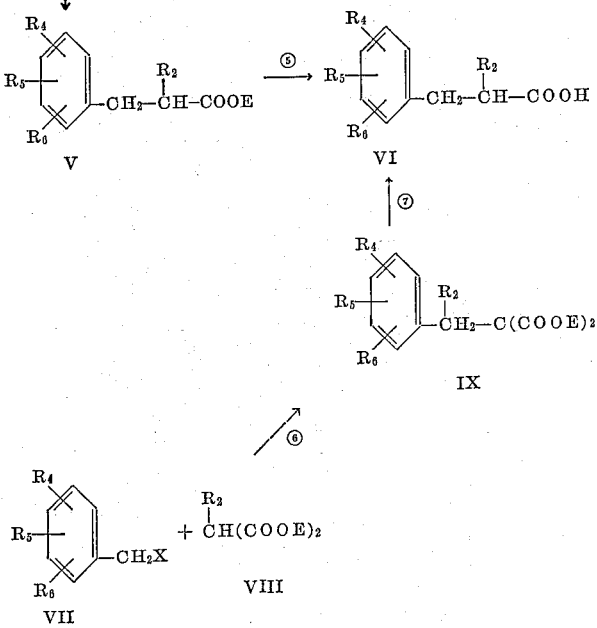

Equivalents:
  X, E, $R_2$, $R_4$, $R_5$ same as Flow Sheet I.
  $R_3$=H, lower alkyl, halogenated lower alkyl.
  $R_1$=aryl or heteroaryl.

Reagents:
  ① Friedel-Crafts Reaction using a Lewis Acid catalyst Cf. Organic Reactions, Vol. II, p. 130.
  ② Heat with polyphosphoric acid.
  ③ Reformatsky Reaction: Zn in inert solvent, heat.
  ④ p-Toluene sulfonic acid and $CaCl_2$ or $I_2$ at 200°.
  ⑤ Wittig Reaction using $(C_6H_5)_3$ P=C-COOE 20–80° in ether or benzene.
  ⑥ Reaction with aldehyde or ketone, using strong base as catalyst (K-t-butoxide or any alkoxide, NaOH, KOH, $NaNH_2$, etc.), warming if necessary to form the carbanion in solvents such as liquid ammonia, dimethylformamide, 1,2 - dimethoxyethane, pyridine, and aqueous alcohol.
  ⑦ Bromine, 0° carbon tetrachloride and then α-collidine, 120–175°.
  ⑧ 20–80°. $R_1$—CH=P(Ph)$_3$ ether or benzene as solvent.

(II) *Preparation of α-(1-substituted-methylenyl-3-indenyl)aliphatic acids*

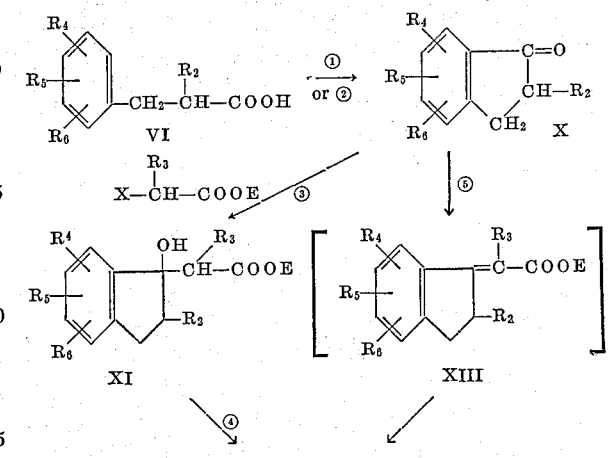

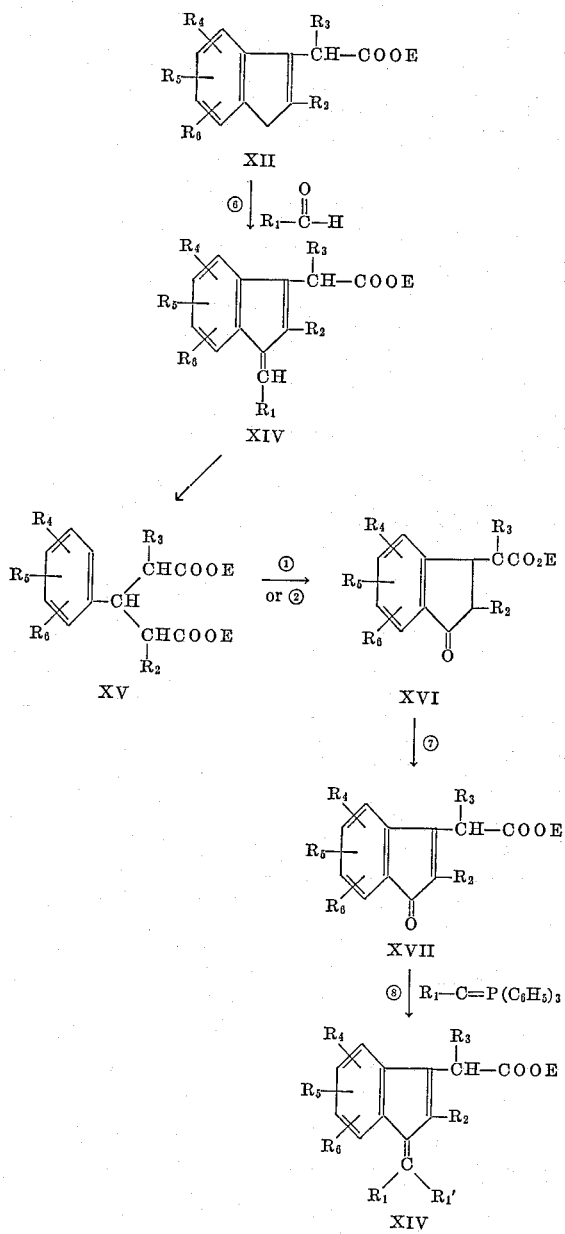

In the preparation of the compounds used in this invention, again a number of routes are possible, as shown in Flow Sheet II. The first step is the ring closure of the β-aryl propionic acid to form an indanone which may be carried out by a Friedel-Crafts Reaction using a Lewis acid catalyst (Cf. Organic Reactions, Vol. 2, p. 130) or by heating with polyphosphoric acid. The indanone may be condensed with an α-halo ester in the Reformatsky Reaction to introduce the aliphatic acid side chain by replacing the carboxyl group. Alternatively, this introduction can be carried out by the use of a Wittig Reaction in which the reagent is a α-triphenylphosphinyl ester, a reagent which replaces the carbonyl with a double bond to a carbon. This is then immediately rearranged into the indene. If the Reformatsky Reaction route is used, the intermediate 3-hydroxy-3-aliphatic acid derivative must be dehydrated to the indene. The introduction of the 1-substituent is carried out again in one of two ways. The first is the direct reaction of the indene with the aldehyde of the structural characteristics defined, using a strong base as a catalyst and warming, if necessary, to form the carbanion. A variety of other bases such as sodium hydroxide, potassium hydroxide, sodamide, quaternary ammonium hydroxides and the like may be used. The reaction can be carried out in a number of solvents such as polar solvents like dimethoxyethane, aqueous methanol, pyridine, liquid ammonia, dimethylformamide and the like or even in non-polar solvents such as benzene, etc. Alternatively, an indanone can be brominated and then dehydrogenbrominated to an indenone as described by H. O. House et al. in J. Am. Chem. Soc. 82, 1452 (1960), and the indenone carbonyl replaced by the substituent using the α-triphenyl-phosphinyl compounds of the desired structure. These reactions are all described in Flow Sheet II. Note that E in the third stage and in the 5th stage is a lower alkoxy group and thus forms a lower alkyl ester of the desired compound. This can then be hydrolyzed to give the free acids from which the salts, other esters and the amides may be formed. Steps 6, 7 and 8 of Flow Sheet II can also be carried out when E is hydrogen.

In the introduction of the 1-substituent by either of the methods described in Flow Sheet II, any aryl or heteroaryl aldehyde may be used either directly in the base condensation or in the form of its Wittig reagent in the alternative route. Among the aldehydes which may be used are benzaldehyde and substituted benzaldehydes such as 4-chlorobenzaldehyde,
2-chlorobenzaldehyde,
4-bromobenzaldehyde,
2,4-dichloro or dibromobenzaldehyde,
4-methylthiobenzaldehyde,
4-methyl, ethyl, propyl, i-propyl, butyl or t-butyl-benzaldehyde,
4-fluorobenzaldehyde,
4-trifluoromethylbenzaldehyde,
3-trifluoromethylbenzaldehyde,
4-dimethylsulfamylbenzaldehyde,
4-methylsulfamylbenzaldehyde,
2-nitro-4-chlorobenzaldehyde,
2-methoxy-4-dichlorobenzaldehyde,
2-nitro-4-methylbenzaldehyde,
2-nitro-4-fluorobenzaldehyde,
2-nitro-4-methoxybenzaldehyde,
p-anisaldehyde,
salicylaldehyde,
vanillin,
p-terephthalaldehydic acid amides (e.g.,
  the methyl, dimethyl, methylethyl and diethylamides),
pyridine 2,3 and 4-aldehydes,
thiophene 2 or 3-aldehydes,
pyrazine aldehyde,
pyrrol-2-aldehyde,
furfural,
pyrimidine-2-aldehyde,
α and β-naphthaldehyde,
benzothiazole-2-aldehyde,
3-nitrothiophene-2-aldehyde,
furyl-2-aldehyde,
1-methylpyrrol-2-aldehyde,
thiazole-2-aldehyde,
1-methylpyrazole-5-aldehyde,
oxazole-4-aldehyde,
5-styryl-6-ethoxyoxazole-2-aldehyde,
1-methylpyridine-4-aldehyde,
2-ethoxypyrane-3-aldehyde,
1-phenylpyridazine-6-aldehyde,
1-methylindole-3-aldehyde,
5-chlorobenzo-3-aldehyde,
thionaphthene-3-aldehyde,
benzofuran-5-aldehyde,
1-methylbenzimidazole-2-aldehyde,
7-aza-indole-3-aldehyde,
3-methylbenzopyrane,
quinoline and 8-aldehydes, isoquinoline-4-aldehyde,
quinoxaline-2-aldehyde,
naphthyridine-2-aldehyde,
benzoxazole-2-aldehyde,
and the like. Substituents on the aromatic rings are preferably in the 4-position.

Although the syntheses described produces esters of the acids of this invention, some desired esters are more easily obtained by forming a simple ester of the final acid, hydrolyzing to the free acid and re-esterifying. The simple lower alkyl or benzyl esters are usually the ones used in the synthesis of the compounds. Other esters are more desirable from the standpoint of therapeutic utility of the compounds, such as the methoxymethyl, diethylaminoethyl, dimethylaminoethyl, dimethylaminopropyl, diethylaminopropyl, N-pyrollidinylethyl, N-piperidinylethyl, N-pyrollidinylmethyl, N-methyl-2-pyrollidinylmethyl, N-morpholinylethyl, N-ethyl-2-piperidinylethyl, 4-methyl-1-piperazinylethyl, methoxyethoxyethyl, and the like. These are mostly prepared from the corresponding alcohol and the indenyl acid.

The amides, both the simple amide and the substituted amides, are similarly prepared from the indenyl acids and the corresponding amines. Especially useful therapeutically are the morpholide, the bishydroxyethylamide and the like.

Similarly, salts are obtained by neutralizing the indenyl acids with bases or by metathesis of other salts. Especially useful are the metallic salts such as the alkali metal or alkaline earth salts and the amine and quaternary ammonium salts, which are water soluble, but the heavy metal salts such as iron, aluminum, etc. are also usable for some purposes.

As has been pointed out above, it is preferable in the preparation of many types of the compounds of this invention, to use a nitro substituent on the benzene ring of the indanone nucleus and covert it later to a desired substituent since by this route a great many substituents can be reached. This is done by reduction of the nitro to the amino group followed by use of the Sandmeyer Reaction to introduce chlorine, bromine, cyano or xanthate in place of the amino. From the cyano derivatives hydrolysis yields the carboxamide and carboxylic acid; other derivatives of the carboxy group such as the esters can then be prepared. The xanthates, by hydrolysis, yield the mercapto group which may be oxidized readily to the sulfonic acid or alkylated to an alkylthio group which can then be oxidized to alkylsulfonyl groups. These reactions may be carried out either before or after the introduction of the 1-substituent.

The procedure of Flow Sheet II is especially advantageous when substituents other than alkyl groups are to be on the 2-position of the indene ring system. Such substituents as phenyl, benzyl, alkoxy, arylthio such as phenylthio, alkylthio such as methylthio and ethylthio and nitro are best introduced by constructing the proper indanone and replacing the keto group by the desired aliphatic acid side chain.

Many of the indanones usable in Flow Sheet II are known in the literature and are thus readily available as intermediates for the rest of the synthesis. Among the compounds of this type which are known are:

5-methoxyindanone
6-methoxyindanone
6-methyl-2-benzylindanone
5-methylindanone
5-methyl-6-methoxyindanone
5-methyl-7-chloroindanone
4-methoxy-7-chloroindanone
4-isopropyl-2,7-dimethylindanone
5-nitroindanone
7-nitroindanone
7-phenylindanone
2-phenylindanone
6,7-benzoindanone
5,6,7-trichloroindanone
5-benzyloxyindanone
2-n-butylindanone
5-methylthioindanone
5-methoxy-7-nitroindanone Our invention can be illustrated by the following examples:

EXAMPLE 1

*6-methoxy-2-methylindanone*

In a 500 ml. 3-necked flask is placed 36.2 g. (0.55 mole) of zinc dust and in a 250 ml. addition funnel is charged a solution of 80 ml. anhydrous benzene, 20 ml. of anhydrous ether, 80 g. (0.58 mole) of p-anisaldehyde and 98 g. (0.55 mole) of ethyl-2-bromopropionate. About 10 ml. of the solution is added to the zinc dust with vigorous stirring and the mixture is warmed gently until an exothermic reaction commences. The remaining reactants are added dropwise at such a rate that the reaction mixture is refluxing smoothly on its own accord (ca. 30–35 min.). After addition is completed the mixture is placed in a water bath and refluxed for 30 minutes. After cooling to 0°, 250 ml. of 10% sulfuric acid is added with vigorous stirring. The benzene layer is extracted twice with 50 ml. portions of 5% sulfuric acid and washed twice with 50 ml. portions of water. The aqueous acidic layers are combined and extracted with 2×50 ml. ether. The combined etheral and benzene extracts are dried over sodium sulfate. Evaporation of solvent and fractionation of the residue through a 6″ Vigreux column affords 89 g. (69%) of the product, ethyl-2-hydroxy-2-(p-methoxyphenyl)-1-methylpropionate, B.P. 165–160° (1.5 mm.).

By the method described in Vander Zanden, Rec. trav. chim., 68, 413 (1949), the above compound is converted to 6-methoxy-2-methylindanone.

EXAMPLE 2

*Ethyl-5-methoxy-2-methyl-3-indenyl acetate*

A solution of 13.4 g. of 6-methoxy-2-methylindanone and 21 g. of ethyl bromoacetate in 45 ml. benzene is added over a period of 5 minutes to 21 g. of zinc amalgam (prepared according to Org. Syn. Coll., vol. 3) in 110 ml. benzene and 40 ml. dry ether. A few crystals of iodine are added to start the reaction, and the reaction mixture is maintained at reflux temperature (ca. 65°) with external heating. At 3 hour intervals two batches of 10 g. zinc amalgam and 10 g. bromoester are added and the mixture is then refluxed for 8 hours. After addition of 30 ml. of ethanol and 150 ml. of acetic acid, the mixture is poured into 700 ml. of 1:1 aqueous acetic acid. The organic layer is separated, and the aqueous layer is extracted twice with ether. The combined organic layers are washed thoroughly with water, ammonium hydroxide and water. Drying over sodium sulfate, evaporation of solvent in vacuo followed by pumping at 80° (bath temp.) (1–2 mm.) gives a crude ethyl-(1-hydroxy-2-methyl-6-methoxy-indenyl) acetate (ca. 18 g.).

A mixture of the above crude hydroxyester, 20 g. of p-toluenesulfonic acid monohydrate and 20 g. of anhydrous calcium chloride in 250 ml. toluene is refluxed overnight. The solution is filtered and the solid residue is washed with benzene. The combined benzene solution is washed with water, sodium-bicarbonate, water and then dried over sodium sulfate. After evaporation the crude ethyl-5-methoxy - 2 - methyl - 3 - indenyl acetate is chromatographed on acid-washed alumina and the product is eluted with petroleum ether-ether (v./v. 50–100%) as a yellow oil (11.8 g., 70%).

EXAMPLE 3

*6-methoxy-2-methylindanone*

α-Methyl-β-(p-methoxyphenyl)propionic acid (15 g.) is added to 170 g. of polyphosphoric acid at 50° and the mixture is heated at 83–90° for two hours. The syrup is poured into iced water, stirred for one-half hour and then extracted with ether three times. The ethanol solution is washed with water twice and 5% $NaHCO_3$ five times until all the acidic material has been removed. The remaining neutral solution is washed with water and dried over sodium sulfate. Evaporation of the solution gives 9.1 g. of the indanone as a pale yellow oil.

EXAMPLE 4

*α-Methyl-β-(p-methylthiophenyl)propionic acid*

To a solution of 2.3 (0.1 mole) of sodium in 100 ml. of absolute alcohol is added 17.4 g. (0.1 mole) of diethyl methylmalonate and 17.3 g. (0.1 mole) of p-methylthiobenzylchloride. The mixture is heated under a reflux in a water bath for three hours. The reaction mixture is poured into water and the aqueous solution is extracted six times with ether and dried. It is then evaporated to yield diethyl methyl-p-methylthiobenzyl malonate. The crude product is then saponified by heating with excess 4% sodium hydroxide in aqueous ethanolic solution. The solution thus formed is concentrated, extracted with ether to remove any neutral material, and acidified with dilute sulfuric acid. The acidic mixture is heated on a steam bath for one hour, cooled and then extracted with ether. Evaporation of the ether solution gives α-methyl-β-(p-methylthiophenyl)propionic acid.

EXAMPLE 5

*Ethyl-3-hydroxy-2-methyl-5-nitro-3-indanylacetate*

The procedure of Example 2 is followed using 2-methyl-6-nitro indanone in equivalent quantities in place of 6-methoxy-2-methyl indanone used therein. After the mixture is condensed, 30 ml. of ethanol and 50 ml. of acetic acid are added. The mixture is then poured into 700 ml. of water. Extraction with ether gives ethyl-3-hydroxy-2-methyl-5-nitro-3-indanyl acetate.

EXAMPLE 6

*Ethyl-5-dimethylamino-3-hydroxy-2-methyl-3-indanylacetate*

A solution of 0.05 mole of ethyl-3-hydroxy-2-methyl-5-nitro-3-indanylacetate, 0.2 mole of 38% aqueous formaldehyde and 2 ml. of acetic acid in 100 ml. ethanol is reduced catalytically in the presence of a 10% Pd/C catalyst under 40 lb. p.s.i. hydrogen presence at room temperature. The solution is filtered, evaporated and chromatographed on 300 g. of silica gel to give ethyl-5-dimethylamino-3-hydroxy-2-methyl-3-indanylacetate.

EXAMPLE 7

*Ethyl-5-nitro-2-methyl-3-indenylacetate*

A mixture of 10 g. of ethyl-3-hydroxy-2-methyl-5-nitro-3-indanylacetate, 15 g. of p-toluene-sulfonic acid monohydrate and 20 g. of anhydrous calcium chloride in 150 ml. 1,2-dimethoxyethane is refluxed overnight. The hot solution is filtered and then added to 500 ml. of water. The aqueous solution is treated with slight excess of dilute sodium hydroxide and extracted with ether. Evaporation of the ether solution and chromatography of the crude product on 200 g. of neutral alumina using ether-petroleum ether (v./v. 20–50%) as eluent gives ethyl-5-nitro-2-methyl-3-indenylacetate.

EXAMPLE 8

*1-p-chlorobenzylidenyl-5-methoxy-2-methyl-3-indenyl acetic acid*

To a solution of 1.35 g. of ethyl(5-methoxy-2-methyl-3-indenyl)acetate in 7.0 ml. dry dimethoxyethane is added 0.80 g. of p-chlorobenzaldehyde followed by 0.635 g. of potassium tertiary butoxide with ice-cooling and stirring. Upon addition of the base the light yellow color turns to an intense purple color. The reaction mixture is stirred at 0° for 4 hours, during that interval the color changes to light brown and an insoluble potassium salt gradually separates out. The reaction mixture is stirred at room temperature overnight and it becomes a thick paste. The precipitate (very fine particle) is centrifuged and washed with 3 ml. of dimethoxyethane. The pale yellow precipitate is dissolved in a small amount of hot water and acidified with dilute hydrochloric acid. The yellow solid is filtered and dried at 70° (1 mm.), 105 g. The crude acid is dissolved in 10 ml. methanol with gentle warming. On cooling to room temperature a first crop (0.61 g.) is recovered as fine needles. The mother liquor is concentrated in vacuo to 5 ml. which on cooling in a refrigerator gives a second crop of 0.15 g. The combined 2 crops of product, M.P. 153–166° (believed to be methanol solvated) is recrystallized once more from 5 ml. of methanol and then from 4 ml. benzene (dissolved with warming) plus 2 ml. of Skelly-solve B. On cooling to 0°, 440 mg. of the pure acid, M.P. 167–168° is obtained as light yellow prisms, U.V. absorption: $\lambda_{max}$. 2400, 2880 and 3400. E% 628, 450 and 405.

EXAMPLE 9

*1-p-chlorobenzylidene-5-dimethylamino-2-methyl-3-indenyl acetic acid*

To a solution of 2.5 g. of the ester from Example 6 in 15 ml. of 1,2-dimethoxyethane at 0° is added 1.4 g. of p-chlorobenzaldehyde followed by 1.1 g. of potassium t-butoxide. The reaction mixture is kept in the ice-bath for 4 hours and then allowed to stand at room temperature for 18 hours. The mixture is diluted with 15 ml. of ether and the potassium salt is filtered. The salt is dissolved in 30 ml. of water and neutralized with dilute hydrochloric acid to pH 6–6.5. The crude acid precipitated is collected by filtration and chromatographed on a silica gel column, using ether-petroleum ether (v./v. 50–100%) as eluent to give pure 1-p-chlorobenzylidene-5-dimethylamino-2-methyl-3-indenyl acetic acid.

EXAMPLE 10

*1-benzylidene-5-methoxy-2-methyl-3-indenylacetic acid*

A solution of 1.98 g. (0.009 mole) of 5-methoxy-2-methyl-3-indenylacetic acid (M.P. 172°) from saponification of the corresponding ethyl ester described above, in 25 ml. of 1,2-dimethoxyethane is added dropwise to a suspension of sodamide (from 0.46 g. sodium) in 250 ml. of liquid ammonia. The mixture is stirred for 20 minutes and then a solution of 1.00 g. of benzaldehyde in 5 ml. of 1,2-dimethoxyethane is added. After 3 hours, 1.24 g. of ammonium chloride followed by 10 ml. of water is added to decompose the reaction mixture. The mixture is poured into water and extracted with ether. The aqueous phase is acidified with hydrochloric acid to yield 2.7 g. of the product. Recrystallization from ethyl acetate-petroleum ether gives pure 1-benzylidene-5-methoxy-2-methyl-3-indenylacetic acid, M.P. 162–163.5°.

EXAMPLE 11

*1-(p-methylbenzylidene)-5-methoxy-2-methyl-3-indenylacetic acid*

When p-tolualdehyde is used in place of benzaldehyde in the above Example 10, there is obtained 1-(p-methylbenzylidene)-5-methoxy - 2 - methyl - 3 - indenyl - acetic acid, M.P. 174–176°.

EXAMPLE 12

*5-methoxy-1-oxo-3-indanyl-acetic acid*

A mixture of 10 g. of β-(m-methoxyphenyl)glutaric acid in 100 ml. of polyphosphoric acid is heated with stirring under nitrogen at 90–120° for two hours. The mixture is poured into 1.5 l. of ice water with stirring and the resulting emulsion is extracted with ether 4×200 ml. The ether layer is washed with water and dried over sodium sulfate. Evaporation of solvent and chromatography of the residue on a silica gel column (1 lb.) gives 5-methoxy-1-oxo-3-indanyl acetic acid.

The acid is converted to its methyl ester with methanolic hydrogen chloride in the usual manner.

EXAMPLE 13

*1-p-chlorobenzylidene-5-methoxy-3-indanylacetic acid*

A solution of freshly prepared n-butyl lithium (0.1 mole) in 60 ml. of ether is added dropwise to a mixture of 0.1 mole of triphenyl p-chlorobenzyl phosphonium bromide, prepared in a manner according to Bergmann and Dueza, Ann. 603, 36 (1957), and 500 ml. of ether under nitrogen. After stirring one hour at room temperature, 0.09 mole of the above indanylacetate in 50 ml. ether is added and the mixture is heated in a bomb at 50–80° for 2–4 hours. After cooling the solution is filtered, washed with water, dried over sodium sulfate and evaporated to a syrup. The crude product is chromatographed on 600 g. of acid-washed alumina using a mixture of ether-petroleum ether (v./v. 20–50%) as eluent.

Saponification of the above ester with 0.1 N sodium hydroxide in 90% aqueous ethanol at room temperature for 18 hours gives the corresponding acid, 1-p-chlorobenzylidene-5-methoxy-3-indanylacetic acid.

EXAMPLE 14

*1-(p-chlorobenzylidene)-5-hydroxy-2-methyl-3-indenyl acetic acid*

A mixture of 0.2 g. of 1 - (p - chlorobenzylidene)-5-methoxy-2-methyl-3-indenyl acetic acid and 2.0 g. of pyridine hydrochloride is heated under nitrogen at 170–180° for 30 minutes. The reaction mixture is cooled, poured into iced water and extracted with ether. The ethereal solution is washed once with dilute hydrochloric acid and then extracted with sodium bicarbonate. The bicarbonate solution is acidified and again extracted with ether. Evaporation of the ether solution and recrystallization of the residual solid from chloroform-petroleum ether gives 1-(p-chlorobenzylidene)-5-hydroxy-2-methyl-3-indenylacetic acid, M.P. 175.5–176°.

EXAMPLE 15

*α-(5-methoxy-2-methyl-3-indenyl)propionic acid*

The procedure of Example 2 is followed using ethyl α-bromopropionate in equivalent quantities in place of ethyl bromoacetate used therein. There is obtained ethyl α-(1-hydroxy - 6 - methoxy - 2 - methyl-1-indanyl)propionate and it is then dehydrated to ethyl α-(5-methoxy-2-methyl-3-indenyl)propionate in the same manner. The U.V. spectrum of the product shows $\lambda_{max}$. 2210, 2610, 2930 and 3040. A, E% 709, 221, 115 and 107.

The above ester is saponified to give α-(5-methoxy-2-methyl-3-indenyl)propionic acid, U.V. absorption: $\lambda_{max}$. 2210, 2625, 2930, 3040. A, E% 795, 301, 132 and 128.

EXAMPLE 16

*α-(1-p-chlorobenzylidene-5-methoxy-2-methyl-3-indenyl)-propionic acid*

To 1.0 g. of α-(5-methoxy-2-methyl-3-idenyl)-propionic acid in 4.5 cc. of CaH dried DME at 0° is added 0.572 g. (0.004 mole) of p-chlorobenzaldehyde followed by 0.46 g. of potassium t-butoxide. An immediate purple color is observed. The mixture is kept at this temperature 3.5 hours, then allowed to stand at room temperature for 2 days.

The reaction mixture is poured into water acidified with 2.5 N HCl, and extracted with ether. The ether solution is then extracted with 5% $Na_2CO_3$ solution. The carbonate solution is filtered, then acidified with 2.50 HCl, extracted with $Et_2O$. The ether solution is washed with water and dried over sodium sulfate. The ether solution is then filtered, converted to a yellow oil and the yellow oil converted to the methyl ester by refluxing 4.5 hours with 150 cc. anhydrous methanol and 5 cc. concentrated $H_2SO_4$. The methanol solution is concentrated to 20 cc. and poured into ether and water. The ether layer is washed with water, bicarbonate and carbonate solutions, water, and dried over $Na_2SO_4$. The solution is filtered and 10 g. silica gel added and the mixture concentrated to dryness on a rotary evaporator. This solid is placed on a column of 200 g. silica gel and eluted with 1:1 benzene $CHCl_3$. Each fraction is ca. 80 cc. Fraction 16–25 yields 250 mg. of the pure methyl ester as a yellow oil. Yield: 250–260 mg. of a yellow oil. Qual. U.V. $\lambda_{max}$. 3410, 2875, 2380 A.

To this oil in 3.9 cc. EtOH is added 0.3 cc. 11.7 N NaOH and 0.3 cc. $H_2O$, and the mixture is stirred at room temperature under a nitrogen atmosphere for 18 hours. The saponification mixture yields 235 mg. of α-(1 - p - chlorobenzylidene-5-methoxy-2-methyl-3-indenyl) propionic acid as a yellow solid. U.V. absorption: $\lambda_{max}$. 2410, 2880 and 3440 A; E% 542, 509 and 370. Calcd. for $C_{20}H_{18}ClO_3$: C, 70.27; H, 5.30; Cl, 10.37. Found: C, 69.56; H, 5.61; Cl, 10.68.

EXAMPLE 17

*α-[1-(p-methylthiobenzylidene)-2-methyl-5-methoxy-3-indenyl]-propionic acid*

To a solution of 0.5 g. (0.00192 mole) of ethyl-α-[2-methyl-5-methoxy-3-indenyl]-propionic acid and 0.595 g. (0.0039 mole) of p-methylthiobenzaldehyde in 3 ml. of anhydrous pyridine is added 1.63 g. of a 40% solution of benzyltrimethylammonium hydroxide (Triton-B) in methanol. The resulting red-purple solution is allowed to stir at room temperature overnight.

The mixture is poured into a mixture of ice and water, acidified in 2.5 N HCl, and extracted with ether. The ether solution is then washed with 2.5 N HCl till washing acidifies (once), then with water till neutral. The ether layer is then extracted with 5% $Na_2CO_3$ solution. The $Na_2CO_3$ solution is washed with ether, acidified and extracted with ether. Ether solution is washed with water, dried over $Na_2CO_4$, and concentrated in vacuo to a yellow oil which foams up to a clear yellow solid on pumping at 0.5–1 mm. Yield: 650 mg. (93%). Thin layer chromatography of the product shows only one spot when eluted with a (v./v. 4:3:5 of isopropanol: 10% $NH_4OH$: ethyl acetate mixture:
U.V. absorption $\lambda_{max}$. 3525; 2910, 2540; 2450; E% 399; 260, 510 and 498.

EXAMPLE 18

*1-p-chlorobenzylidene-2-methyl-5-methoxy-3-indenylacetmorpholide*

A mixture of 1-p-chlorobenzylidene-2-methyl-5-methoxy-3-idenylacetic acid (0.01 mole) and thionyl chloride (0.03 mole) in a dried flask, condenser and drying tube set-up is heated on the steam bath until evolution of gas ceases. Excess thionyl chloride is then removed in vacuo, the residue taken up in a slight excess of anhydrous ether and added slowly to a vigorously stirred, ice-cooled solution of dry morpholine (0.035 mole) in 100 ml. of ether. The mixture is stirred overnight at room temperature, filtered, the morpholine hydrochloride washed with excess ether, and the combined ether filtrates washed with 2 x 100 ml. water, dried over anhydrous sodium sulfate, filtered, and the ether removed in vacuo. Chromatography of the crude product on a silica-gel column, using v./v. 50–100% ether in petroleum ether as eluent gives the desired morpholide.

Similarly, when morpholine is replaced by an equivalent amount of the following amines, the corresponding amides are obtained.

Dimethylamine
Ethanolamine
Benzylamine
N,N-diethylethylenediamine

Benzylglycinate
Piperidine
Pyrrolidine
N-methylpiperazine
N-phenylpiperazine
N-hydroxyethylpiperazine
Piperazine
Diethylamine
Diethanolamine
Aniline
p-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethyl-glycine amide
N,N-dibutylglycine amide
N-methyl-2-aminomethylpiperidine
N-methyl-2-aminomethylpyrrolidine
β-Ethoxyethylamine
Di(β-ethoxyethyl)amine
β-Phenethylamine
α-Phenethylamine
Dibenzylamine
D-mannosamine

EXAMPLE 19

*Esters of 1-p-chlorobenzylidene-2-methyl-5-methoxy-3-indenyl acetic acid*

(A) *Simple esters.*—A mixture of .1 mole of 1-p-chlorobenzylidene - 2 - methyl-5-methoxy-3-indenyl acetic acid, .2 g. of p-toluene sulfonic acid, 100 ml. of absolute ethanol and 75 ml. of dry benzene is refluxed on a steam bath while slowly distilling the solvent. After 17 hours the residual solvent is removed under reduced pressure. The residue is slurried in aqueous sodium bicarbonate and then with water until neutral. The resulting ethyl ester may be recrystallized from organic solvents such as ethyl acetate, benzene and the like. When methanol, propanol, t-butanol and benzyl alcohol are used instead of the ethanol in the above procedure, there is obtained the corresponding methyl, propyl, t-butyl and benzyl esters.

(B) *Alkoxyalkyl esters.*—Chloromethyl methyl ether (0.055 mole) is added to a suspension of 1-p-chlorobenzylidene-2-methyl-5-methoxy-3-indenyl acetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of saturated sodium bicarbonate solution and twice with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluant, to give methoxymethyl 1-p-chlorobenzylidene-2-methyl-5-methoxy-3-indenyl-acetate.

(C) *Dialkylamino-alkyl esters.*—A solution of 0.0054 mole of N,N'-dicyclohexylcarbodiimide in 6 ml. of anhydrous tetrahydrofuran is added to a solution of 1-p-chlorobenzyl - 2 - methyl-5-methoxy-3-indenylacetic acid (0.005 mole) and 2-diethylaminoethanol (0.0054 mole) in 17 ml. of anhydrous tetrahydrofuran. The mixture is stirred at ambient temperature, overnight. The dicyclohexylurea is removed by filtration and 2 ml. of glacial acetic acid is added to the filtrate. After the mixture has stood for one hour, it is filtered and 200 ml. of ether is added to the filtrate. The solution is then extracted three times with 100 ml. of 2.5 N HCl and the extracts are combined, washed twice with 100 ml. of ether, ice-cooled, made slightly alkaline with concentrated NH₄OH and extracted three times with 100 ml. of ether. The ether extracts are combined, washed ten times with 100 ml. of water to remove traces of starting amine, dried over anhydrous potassium carbonate, filtered and evaporated in vacuo. The oily residue is β-diethylaminoethyl 1 - p - chlorobenzylidene-2-methyl-5-methoxy-3-indenylacetate.

When 2 - dimethylaminoethanol, 3-dimethylamino-1-propanol, 3-diethylamino-1-propanol, N-β-hydroxyethylpiperidine, N-β-hydroxyethylpyrrolidine, N-hydroxymethylpyrrolidine, N-methyl-2-hydroxymethylpyrrolidine, N-ethyl - 2 - hydroxymethylpiperidine, 1-β-hydroxyethyl-4'-methyl-piperazine or N-β-hydroxyethyl morpholine is used in the above procedure in place of 2-diethylaminoethanol, the corresponding β-dimethylaminoethyl, γ-dimethylaminopropyl, γ-diethylaminopropyl, β-N-piperidinylethyl, β-N-pyrrolidinylethyl, N-pyrrolidinylmethyl, 2'-(1' - methylpyrrolidinylmethyl), 4-methyl-1-piperazinylethyl, N-ethyl-2-piperidinylethyl and N-morpholinylethyl esters are obtained.

(D) *Phenyl - 1 - p - chlorobenzylidenyl-2-methyl-5-methoxy-3-indenylacetate.*—A solution of 0.0054 mole of N,N'-dicyclohexylcarbodiimide in 6 ml. of anhydrous tetrahydrofuran is added to a solution of 1-p-chlorobenzylidenyl - 2 - methyl-5-methoxy-3-indenylacetic acid (0.005 mole) and phenol (0.0054 mole) in 17 ml. of anhydrous tetrahydrofuran. The mixture is shaken vigorously and allowed to sit, stoppered, at room temperature overnight.

After filtering off the N,N'-dicyclohexylurea, 2 ml. of glacial acetic acid is added to the filtrate and the mixture allowed to stand one hour. After filtering, 200 ml. ether is added to the filtrate and the ether solution washed with 2×100 ml. saturated sodium bicarbonate solution and 3×100 ml. water and then dried over anhydrous sodium sulfate. The mixture is filtered, concentrated in vacuo to 25 ml. and chromatographed on a 150 g. acid-washed alumina column using ether-petroleum ether (v./v. 10–60%) as eluent to give phenyl-1-p-chlorobenzylidenyl-2-methyl-5-methoxy-3-indenylacetate.

Similarly, using 2-(2-methoxyethoxy)-ethanol, glycol or N-acetyl-ethanolamine in place of phenol in the above procedure gives 2 - (2-methoxyethoxy)-ethyl-1-p-chlorobenzylidenyl - 2 - methyl-5-methoxy-3-indenylacetate, β-hydroxyethyl - 1 - p - chlorobenzylidenyl - 2 - methyl-5 - methoxy-3-indenylacetate and β-acetamidoethyl-1-p-chlorobenzylidenyl - 2 - methyl-5-methoxy-3-indenylacetate, respectively.

A mixture of .06 mole of sodium 1-p-chlorobenzylidene-2-methyl-5-methoxy-3-indenyl acetate and 0.05 mole of trityl bromide in 100 ml. anhydrous benzene is refluxed with rapid stirring under nitrogen for 5 hours. The hot reaction mixture is filtered and the filtrate is concentrated in vacuo. The residual oil is recrystallized from methyl ethyl ketone to give trityl-1-p-chlorobenzylidene-2-methyl-5-methoxy-3-indenyl acetate.

When any of the other 3-indenyl acids described in other examples are used in place of the above-described acid in any of the above preparations, the corresponding esters are obtained.

EXAMPLE 20

*N-(1-p-chlorobenzylidene-2-methyl-5-methoxy-3-indenylacetyl)-glycine*

(A) *Benzyl-N-(1-p-chlorobenzylidene-2-methyl-5-methoxy-3-indenyl acetyl)-glycinate.*—The procedure of Example 18 is followed using benzylamino acetate in place of the morpholine to produce the above-named compound.

(B) *N-(1-p-chlorobenzylidene-2-methyl-5-methoxy-3-indenylacetyl) - glycine.*—Benzyl - N - (1-p-chlorobenzylidene - 2 - methyl - 5 - methoxy-3-indenylacetyl)glycinate (0.003 mole) in a mixture of 25 ml. of anhydrous ethanol and 2.5 ml. of 1 N sodium hydroxide is allowed to stand at room temperature for 18 hours. The solution is diluted with water and extracted with ether. The aqueous layer is acidified with dilute hydrochloric acid and the organic product is extracted with ethyl acetate, washed with water and dried over sodium sulfate. Evaporation of the solution gives N-(1-p-chlorobenzylidene-2-methyl-5-methoxy-3-indenylacetyl)glycine.

When any of the other 1-aralkylidene-3-indenyl aliphatic acids described in the other examples of these specifications are used in the above procedure in place of the 1-p-chlorobenzylidene-2-methyl-5-methoxy-3-indenyl acetic acid, the corresponding indenyl acyl glycine is obtained.

EXAMPLE 21

*2-methyl-6-fluoroindanone-1*

(A) *Ethyl-4-fluoro-α-methylcinnamate.*—Into a dry 1-liter 3-neck round bottom flask equipped with stirring, thermometer and nitrogen inlet tube is charged sodium hydride (0.384 mole). Ethyl propionate (1.45 mole) is added, the temperature kept at ca. 10° C. with a Dry-Ice-acetone bath. Absolute ethanol (0.48 ml.) is then added, followed by a mixture of ethylpropionate (0.78 mole) and p-fluorobenzaldehyde (0.322 mole) added at such a rate that the temperature stays at 15–20° C. The mixture is cooled to 15°, the Dry-Ice-acetone bath replaced by an ice bath, and the mixture stirred one hour. A solution of 29.2 ml. of glacial acetic acid in 108 ml. water is added, the mixture stirred ca. 15 minutes, transferred to a separatory funnel, the layers separated, and the aqueous layer extracted with 2×54 ml. ether. The ether and organic layers are combined, washed with 2×36 ml. water and 3×97 ml. 10% aqueous potassium carbonate solution, dried over anhydrous potassium carbonate, filtered, and the solvent removed in vacuo. Distillation of the oily residue in vacuo gives ethyl-4-fluoro-α-methylcinnamate, B.P. 125–131°; 5–6 mm.

Similarly, the use of o-fluorobenzaldehyde, m-fluorobenzaldehyde or p-trifluoromethylbenzaldehyde in place of p-fluorobenzaldehyde in the above procedure gives ethyl-2-fluoro-α-methylcinnamate, ethyl-3-fluoro-α-methylcinnamate, and ethyl-4-trifluoromethyl-α-methylcinnamate, respectively.

(B) *4-fluoro-α-methylcinnamic acid.*—To a solution of ethyl-4-fluoro-α-methylcinnamate (0.01 mole) in 25 ml. of ethanol is added a solution of potassium hydroxide (0.01 mole) in 5 ml. water and the mixture stirred overnight at room temperature under a nitrogen atmosphere. Water (ca. 100 ml.) is added, the aqueous mixture washed with 3×100 ml. ether, ice-cooled and acidified with 2.5 N hydrochloric acid, and extracted with 3×100 ml. ethyl acetate. The combined ethyl acetate extracts are washed with 2×100 ml. water, dried over anhydrous sodium sulfate, filtered, and the solvent removed in vacuo leaving 4-fluoro-α-methylcinnamic acid, M.P. 151–153° C. (from ethanol).

Similarly, using ethyl-2-fluoro-α-methylcinnamate, ethyl-3-fluoro-α-methylcinnamate, or ethyl-4-trifluoromethyl-α-methylcinnamate in place of ethyl-4-fluoro-α-methylcinnamate in the above procedure gives 2-fluoro-α-methylcinnamic acid, 3-fluoro-α-methylcinnamic acid and 4-trifluoromethyl-α-methylcinnamic acid, respectively.

(C) *4-fluoro-α-methylhydrocinnamic acid.*—A solution of 4-fluoro-α-methylcinnamic acid (0.23 mole) in 800 ml. of anhydrous ethanol is reduced at room temperature under a hydrogen pressure of 40 p.s.i. in the presence of 2 g. 5% palladium on carbon. After filtering, the ethanol is removed in vacuo, several 40 ml. portions of benzene added and distilled away to remove moisture, and the oily residue dried in vacuo leaving 4-fluoro-α-methylhydrocinnamic acid.

Similarly, reduction of 2-fluoro-α-methylcinnamic acid, 3-fluoro-α-methylcinnamic acid, and 4-trifluoromethyl-α-methylcinnamic acid using the above procedure gives the corresponding hydrocinnamic acid derivative.

(D) *2-methyl-6-fluoroindanone-1.*—The procedure of Example 3 is followed using 4-fluoro-α-methylhydrocinnamic acid in place of the methyl methoxyphenyl propionic acid used there, to yield 2-methyl-6-fluoroindanone-1.

Similarly, 4-fluoro-2-methylindanone-1, 5-fluoro-2-methylindanone-1, and 6-trifluoromethylindanone-1, are obtained via the above procedure (followed by chromatography on an acid-washed alumina column [v./v. 1:30] using ether-petroleum ether [v./v. 0–60%] for the 5-fluoro-2-methylindanone-1) from 2-fluoro-α-methylhydrocinnamic acid, 3-fluoro-α-methylhydrocinnamic acid, and 4-trifluoromethyl-α-methylhydrocinnamic acid, respectively.

EXAMPLE 22

*Ethyl-2-methyl-5-fluoro-3-indenylacetate*

The procedure of Example 2 is followed using 2-methyl-6-fluoroindanone-1 in place of 6-methoxy-2-methylindanone. The product is ethyl-2-methyl-5-fluoro-3-indenylacetate.

Similarly, the use of 4-fluoro-2-methylindanone-1, 5-fluoro-2-methylindanone-1, or 6-trifluoromethyl-2-methylindanone-1, in place of 2-methyl-6-fluoroindanone-1 in the above procedure gives ethyl-2-methyl-7-fluoro-3-indenylacetate, ethyl-2-methyl-6-fluoro-3-indenylacetate, and ethyl-2-methyl-5-trifluoromethyl-3-indenylacetate, respectively.

EXAMPLE 23

*1-p-chlorobenzylidene-2-methyl-5-fluoro-3-indenylacetic acid*

The procedure of Example 8 is followed using ethyl-2 - methyl - 5 - fluoro - 3 - indenylacetate in place of indenyl ester used therein as starting material, to give 1 - p - chlorobenzylidene - 2 - methyl - 5 - fluoro - 3-indenylacetic acid.

Similarly, the use of ethyl - 2 - methyl - 6 - fluoro - 3-indenylacetate, ethyl - 2 - methyl - 7 - fluoro - 3 - indenylacetate, or ethyl - 2 - methyl - 5 - trifluoromethyl - 3-indenylacetate in the same procedure gives 1-p-chlorobenzylidene - 2 - methyl - 6 - fluoro - 3 - indenylacetic acid, 1 - p - chlorobenzylidene - 2 - methyl - 7 - fluoro-3-indenylacetic acid, and 1 - p - chlorobenzylidene - 2-methyl - 5 - trifluoromethyl - 3 - indenylacetic acid, respectively.

When the procedure of Example 8 is followed as in Part A, but using in addition, p-methoxybenzaldehyde in place of p-chlorobenzaldehyde, there is obtained 1 - p-methoxybenzylidene - 2 - methyl - 5 - fluoro - 3 - indenylacetic acid.

EXAMPLE 24

*1-p-chlorobenzylidene-2-phenyl-5-methoxy-3-indenylacetic acid*

The procedure of Example 2 is followed using 2-phenyl-6-methoxy-indanone-1 in place of 6-methoxy-2-methylindanone to give ethyl - 2 - phenyl-5-methoxy-3-indenyl acetate. When this is used in the procedure of Example 8, there is obtained 1 - p - chlorobenzylidene-2-phenyl-5-methoxy-3-indenylacetic acid. When 2-phenylindanone-1 is used as the starting material in place of 2-phenyl-6-methoxyindanone, there is obtained 1-p-chlorobenzylidene-2-phenyl-3-indenylacetic acid.

When 2-thienyl-6-methoxyindanone-1 (prepared by Claisen condensation of anisaldehyde on ethyl thienyl-2-acetate, followed by catalytic reduction over palladium and ring closure with polyphosphoric acid) is used in the above procedure in place of the 2-phenyl-6-methoxy-indanone-1, the corresponding 2-thienyl compound is obtained.

EXAMPLE 25

1-p-chlorobenzylidene-2-benzyl-5-methoxy-3-indenylacetic acid

The procedure of Example 21A is followed, using p-methoxybenzaldehyde as the reagent to obtain ethyl-4-methoxy-α-benzylcinnamate. This compound is used in the procedure of Example 21B; the product therefrom is used in the procedure of Example 21C and the resulting product is then used in the procedure of Example 21D. The compound thus prepared is the intermediate 2-benzyl-6-methoxyindanone-1. When the known compound, α-benzylhydrocinnamic acid is used in the procedure of Example 21D, there is obtained 2-benzyl-indanone-1.

The procedure of Examples 22 and 23 is followed using the 2-benzylindanones prepared above as the starting material. The compounds thus obtained are 1-p-chlorobenzylidene-2-benzyl-5-methoxy-3-indenylacetic acid and 1-p-chlorobenzylidene-2-benzyl-3-indenylacetic acid.

EXAMPLE 26

2-methoxy-4-methyl-indanone-1

A solution of 0.05 mole of 2 - hydroxy - 4 - methyl indanone and 0.055 mole of potassium t-butoxide in 250 ml. dimethylformamide is treated with 0.06 mole of methyl iodide at room temperature for 18 hours. The reaction mixture is diluted with 700 ml. of water and extracted with ether (2×300 ml.). The ethereal solution is dried over sodium sulfate, evaporated to a syrup, and chromatographed on 200 g. of acid-washed alumina using ether-n-hexane (v./v. 20–50%) as eluents to give 2-methoxy-4-methyl-indanone-1.

EXAMPLE 27

1-p-chlorobenzylidene-2-methoxy-7-methyl-3-indenylacetic acid (A) *Ethyl - (1 - hydroxy-2-methoxy-4-methyl-lndenyl) acetate.*—When 2-methoxy-4-methyl-indanone-1 is used in Example 2 in place of 6-methoxy-2-methyl-indanone-1, there is obtained ethyl-(1-hydroxy-2-methoxy-7-methyl-indenyl)acetate.

(B) *Ethyl - 2 - methoxy-7-methyl-3-indenyl acetate.*—To a solution of the above hydroxy ester (0.05 mole) and pyridine (0.06 mole) in 200 ml. ether is added dropwise with ice-cooling and stirring 0.055 mole of methyl chlorosulfinate. After the addition is completed, the mixture is stirred at room temperature for 4 hours and filtered. The filtrate is washed with 0.1 N hydrochloric acid, with water and then with 5% sodium bicarbonate. After drying over sodium sulfate, the solvent is evaporated in vacuo, and the residue is pyrolyzed under nitrogen in the presence of 0.5 ml. of quinoline at (oil bath temperature) 160–240°. The pyrolysis product is redissolved in ether, washed with water and dried over sodium sulfate. Evaporation of the solvent and chromatography of the residue on 200 g. of acid-washed alumina, using ether-n-hexane (v./v. 20–60%) as eluent, gives ethyl-2-methoxy-7-methyl-3-indenyl acetate.

(C) *1 - p - chlorobenzylidenyl-2-methoxy-7-methyl-3-indenylacetic acid.*—When the above indenyl ester is used in place of ethyl-(5-methoxy-2-methyl-3-indenyl) acetate in Example 8, there is obtained 1-p-chlorobenzylidene-2-methoxy-7-methyl-3-indenylacetic acid.

(D) *1 - p - chlorobenzylidene - 2 - hydroxy-7-methyl indenylacetic acid.*—The product of Part C is used in the procedure of Example 14 in place of the 1-p-chlorobenzylidene-2-methoxy-5-methoxy-3-indenylacetic acid used therein, to form 1-p-chlorobenzylidene-2-hydroxy-5-methyl-3-indenylacetic acid.

EXAMPLE 28

1-p-chlorobenzylidene-5-phenyl-3-indenylacetic acid

The procedure of Example 21C is followed, using p-phenylcinnamic acid in place of the α-methyl-4-fluoro-cinnamic acid used therein. The resulting hydrocinnamic acid is used in the procedure of Example 3 to form 6-phenylindanone-1. This compound is then used in the procedure of Example 2 to produce ethyl-6-phenyl-3-indenyl acetate. This ester is condensed with p-chlorobenzaldehyde in the procedure of Example 8 to form the desired 1 - p-chlorobenzylidene-5-phenyl-3-indenylacetic acid.

When 7-phenylindanone-1 is used in the procedure of Example 2 and the product is condensed with p-chlorobenzaldehyde in the procedure of Example 8, there is obtained 1 - p - chlorobenzylidene-4-phenyl-3-indenylacetic acid.

EXAMPLE 29

(A) *1 - p - chlorobenzylidene - 2-phenylthio-3-indenylacetic acid.*—Following the procedure of Example 2, 2-phenylthio indanone-1 is converted to ethyl-2-phenylthio-3-idenylacetate. This ester is condensed with p-chlorobenzaldehyde in the procedure of Example 8 to form the desired 1-p-chlorobenzylidene-2-phenylthio-3-indenylacetic acid.

(B) *1 - p - chlorobenzylidene-2-methylthio-5-methoxy-3-indenylacetic acid.*—2 - bromo-6-methoxyindanone (0.1 mole) dissolved in 150 ml. dry methanol is added slowly, in an atmosphere of nitrogen, to a solution of sodium thiomethoxide prepared from 2.5 g. sodium and 100 ml. dry methanol containing 0.1 mole of methylmercaptan. The solution is refluxed for one hour, concentrated in vacuo, poured into water and then extracted with ether. The ethereal solution is washed with water and dried over sodium sulfate. Evaporation of the solvent followed by chromatography on 300 g. of acid-washed alumina, using ether-n-hexane (v./v. 10–50%) as eluent, gives 2-methylthio-6-methoxy indanone.

Using the procedure of Examples 2 and 8, the above indanone is converted successively to ethyl-(5-methoxy)-2-methylthio-3-indenylacetate and 1-p-chlorobenzylidene-5-methoxy-2-methylthio-3-indenyl acetic acid.

EXAMPLE 30

1-p-chlorobenzylidene-2,6-dimethyl-3-indenyl-α-dimethylaminoacetic acid (A) *Ethyl - 2,6 - dimethyl-3-indenyl-α-aminoacetate.*—A mixture of 0.01 mole of ethyl-2,6-dimethyl-3-indenyl-glyoxalate (prepared from 2,6-dimethylindene and oxalic ester by the procedure of Thiele, Ber. 33, 851 (1900) hydroxylamine hydrochloride (0.026 mole), ethanol (20 ml.) and 5 ml. of pyridine is heated on a steam bath under nitrogen for 3 hours. The mixture is concentrated in vacuo to about 10 ml. and poured into 250 ml. of ice and water. After the ice has melted, the organic material is collected, washed well with water until the odor of pyridine is gone, and dried. The product is dissolved in 25 ml. of ethanol and 0.03 mole of glacial acetic acid is added. Zinc dust (0.012 mole) is added gradually and the mixture is warmed gently until all the zinc is dissolved. The mixture is filtered and 50 ml. of 2.5 N HCl is added. The aqueous phase is washed twice with 50 ml. of chloroform, cooled and made slightly alkaline with concentrated NH₄OH. It is then extracted three times with 50 ml. of chloroform. These extracts are combined, washed with 100 ml. of water twice and dried over $K_2CO_3$. The solution is filtered and concentrated in vacuo to give ethyl-2, 6-dimethyl-3-indenyl-α-amino acetate.

(B) *Ethyl - 2,6 - dimethyl - 3-indenyl-α-dimethylamino acetate.*—A solution of ethyl - 2,6-dimethyl-3-indenyl-α-amino acetate (0.05 mole) and methyliodide (0.15 mole) in 100 ml. acetone is stirred at room temperature for 18 hours in the presence of excess (0.2 mole) potassium carbonate. The solution is filtered, concentrated in vacuo and poured into 300 ml. of water. The product is extracted with ether, washed with water and dried over sodium sulfate. The ethereal solution is evaporated to a syrup and chromatographed on 200 g. of neutral alumina, using ether-petroleum ether (B.P. 30–60°) (v./v. 20–

100%) as eluents to give ethyl-2,6-dimethyl-3-indenyl-α-dimethylamino acetate.

(C) *1 - p - chlorobenzylidenyl - 2,6-dimethyl-3-indenyl-α-dimethylamino acetic acid.*—The procedure of Example 8 is followed using the above ethyl-2,6-dimethyl-3-indenyl-α-dimethylaminoacetate in place of the indenyl ester used therein. The product isolated is then purified by chromatography on a bed of thin plates of 8 inches by 8 inches cross section coated with silica gel, using ethylacetate-1-propanol as the eluent, to produce 1-p-chlorobenzylidenyl - 2,6 - dimethyl-3-indenyl-α-dimethylaminoacetic acid.

EXAMPLE 31

*1-p-chlorobenzylidene-2-methyl-5-methoxy-3-indenyl-α-dimethylaminoacetic acid*

(A) *2-methyl-5-methoxyindene.*—(1) To a mixture of 7.56 g. of sodium borohydride and 200 ml. of isopropanol is added dropwise a solution of 0.2 mole of 2-methyl-6-methoxyindanone in 50 ml. isopropanol at room temperature over a period of one-half hour. The mixture is then heated at the reflux temperature for 4–8 hours, the reduction being followed by thin-layer chromatography. After cooling, the mixture is poured into one liter of iced water and extracted with 3×150 ml. of ether. The ethereal solution is washed with water, dried over sodium sulfate, and evaporated to give crude 2-methyl-6-methoxy-1-indanol.

(2) The above indanol (0.05 mole) is dissolved in a mixture of 25 ml. ether and 4.4 g. (0.055 mole) of pyridine. The solution is cooled to 0° and to this is added slowly 5.8 g. (0.05 mole) methyl chlorosulfinate over a period of 20–25 minutes. After stirring at 0–5° for an additional 30–60 minutes the mixture is poured into iced-water and extracted with ether. The ethereal solution is washed with 0.2 N hydrochloric acid, sodium bicarbonate, water and dried over sodium sulfate. The dried solution is evaporated to a residue. Pyrolysis of the residue under nitrogen with concomitant distillation at bath temperature (100–310°) under partial vacuum gives 2-methyl-5-methoxyindene as a yellow liquid.

(B) *Methyl-2-methyl-5 - methoxy - 3 - indenyl glyoxalate.*—To a solution of 1 g. sodium in 20 ml. absolute ethanol is added 7.5 g. of 2-methyl-5-methoxyindene and 6 g. of dimethyloxalate. The solution is allowed to stand at room temperature for 1–2 hours and is then warmed on a steam bath to complete the reaction. The mixture is cooled and poured into iced-water. After extraction with ether to remove the by-products, the aqueous layer is acidified to give methyl-2-methyl-5-methoxy-3-indenyl glyoxalate.

(C) *Ethyl-2-methyl-5-methoxy-3-indenyl-α - dimethylaminoacetate.*—The procedure of Examples 30A and 30B is followed successively, starting with the product of Part B instead of the dimethyl-3-indenylglyoxalate ester used therein, to produce ethyl-2-methyl-5-methoxy-3-indenyl-α-dimethylaminoacetate.

(D) *1-p-chlorobenzylidene-2-methyl-5-methoxy-3 - indenyl-α-dimethylaminoacetic acid.*—The procedure of Example 8 is followed using the product of Part C in place of the indenyl acetate used therein to form 1-p-chlorobenzylidene-2-methyl-5-methoxy-3-indenyl - α - dimethylaminoacetic acid.

EXAMPLE 32

*1-p-chlorobenzylidene-2-methyl-5-methoxy-3-indenyl-α-methoxyacetic acid*

(A) *Methyl-5-methoxy-2-methyl - 3 - indenyl - α - hydroxyacetate.*—To a solution of methyl - 5 - methoxy - 2 - methyl-3-indenylglyoxalate (0.01 mole) in 50 ml. methanol is added portionwise 0.005 mole of sodium borohydride with ice-cooling and stirring. After two hours at 0–5° and four hours at room temperature the reaction mixture is poured into iced water containing an excess of acetic acid. The product is extracted with ether and the ethereal solution is washed with water, dried over sodium sulfate and concentrated in vacuo. The residue is chromatographed on a silica gel column (200 g.) using ether-petroleum ether (v./v. 50–100%) as eluent to give methyl-5-methoxy-2-methyl-3-indenyl-α-hydroxyacetate.

(B) *Methyl-5-methoxy-2-methyl-3 - indenyl - α - tosyloxyacetate.*—To a solution of 0.02 mole of methyl-5-methoxy-2-methyl-3-indenyl-α-hydroxyacetate in 100 ml. pyridine at 0–5° is added 0.025 mole of p-toluenesulfonyl chloride portionwise. The mixture is allowed to stand at 5–10° for 18 hours and is then poured into iced water. The product is extracted with ether, washed with dilute hydrochloric acid, sodium bicarbonate, water and then dried over sodium sulfate. Evaporation of the solvent and chromatography of the residue on a column of 500 g. silica gel, using benzene-petroleum ether (v./v. 10–50%) as eluent gives the desired sulfonate ester.

(C) *Methyl-5-methoxy-2-methyl - 3 - indenyl - α - methoxyacetate.*—A solution of 0.05 mole of methyl-5-methoxy-2-methyl-3-indenyl-α-tosyloxy acetate and 0.05 mole sodium methoxide in 300 ml. methanol is heated under reflux for 4–8 hours under nitrogen until the solution becomes neutral. The mixture is concentrated in vacuo to ca. 100 ml., poured into water and extracted with ether. The ethereal solution is washed with water, dried over sodium sulfate and evaporated to a residue. The residue is chromatographed on a column of 500 g. of silica gel using ether-petroleum ether (v./v. 30–100%) as eluent to give the product, methyl-5-methoxy-2-methyl-3-indenyl-α-methoxyacetate.

(D) *1-chlorobenzylidene-2-methyl-5 - methoxy - 3 - indenyl-α-methoxy acetic acid.*—The procedure of Example 8 is followed, using the product of Part C in place of the indenyl ester used therein, to produce 1-p-chlorobenzylidene-2-methyl-5,α-dimethoxy-3-indenylacetic acid.

(E) *1-p-chlorobenzylidene-2-methyl-5-methoxy-3 - indenyl-α-hydroxyacetic acid.*—The procedure of Example 8 is followed using the product of Example 33A in place of the ethyl-2-methyl-5-methoxy-3-indenylacetate and using twice the mole usage of potassium-t-butoxide. The product obtained is 1-p-chlorobenzylidene-2 - methyl - 5 - methoxy-3-indenyl-α-hydroxyacetic acid.

EXAMPLE 33

*1-(p-nitrobenzylidene)-2-methyl-5-methoxy-3-indenylacetic acid*

The procedure of Example 8 is followed using p-nitrobenzaldehyde in place of p-chlorobenzaldehyde to yield 1-(p-nitrobenzylidene)-2-methyl-5 - methoxy - 3 - indenyl acetate.

Similarly, the use of m-trifluoromethylbenzaldehyde or 3,4-dichlorobenzaldehyde in place of p-nitrobenzaldehyde in the above procedure gives 1-(m-trifluoromethylbenzylidene)-2-methyl-5-methoxy - 3 - indenylacetic acid and 1-(3,4-dichlorobenzylidene)-2-methyl-5 - methoxy - 3 - indenylacetic acid, respectively.

EXAMPLE 34

*1-(3-nitrothienyl-2-formylidene)-2-methyl-5-methoxy-3-indenylacetic acid*

The procedure of Example 8 is followed using nitrothiophene-2-carboxaldehyde in place of p-chlorobenzaldehyde, to yield 1-(3-nitrothienyl-2-formylidene)-2-methyl-5-methoxy-3-indenylacetic acid.

Similarly, using 2-thiophenecarboxaldehyde, 2-furaldehyde, N-methylpyrrolo-2-aldehyde, thiazole-2-carboxaldehyde, pyridine-2-aldehyde, pyridine-3-aldehyde, pyridine-4-aldehyde, 1-methylimidazole-5-aldehyde, 1-methyl-indole-3-carboxaldehyde, N-methylpiperidine-4-carboxaldehyde, quinoxaline-2-carboxaldehyde, 5-chloro-3-benzofuranecarboxaldehyde, 5-benzofurancarboxaldehyde, 3-thianaphthenecarboxaldehyde, 1-methylbenzimidazole-3-carboxaldehyde, 4H - 1 - 3 - methyl - 4 - oxo - 2 - benzofurancarboxaldehyde, 2-phenyl-2,5-dihydro-3-pyridazinecarboxaldehyde, 3-quinolinecarboxaldehyde, 4-quinolinecarboxaldehyde, 5-quinolinecarboxaldehyde, 6-quinolinecarboxaldehyde, 7-quinolinecarboxaldehyde, 8-quinolinecarboxaldehyde, 2 - ethoxytetrahydropyran - 3 - carboxaldehyde, 4-oxazole-carboxaldehyde, 5-ethoxy-4-styryl-2-oxazolecarboxaldehyde, 4-isoquinolinecarboxaldehyde, 7-azaindole-3-carboxaldehyde, or 1,7-naphthyridine-2-carboxaldehyde in the above procedure gives the corresponding substituted indene-3-acetic acids.

EXAMPLE 35

*1-p-chlorobenzylidene-2-fluoro-3-indenylacetic acid*

The procedure of Example 2 is followed using 2-fluoroindanone in place of the indanone used therein. The product is then used in the procedure of Example 8 to give 1-p-chlorobenzylidene-2-fluoro-3-indenylacetic acid.

EXAMPLE 36

*Methyl-5-methoxy-2-methyl-3-indenyl-α-fluoro acetate*

A mixture of potassium fluoride (0.1 mole) and methyl-5-methoxy-2-methyl-3-indenyl-α-tosyloxy acetate (0.05 mole) in 200 ml. dimethylformamide is heated under nitrogen at the reflux temperature for 2–4 hours. The reaction mixture is cooled, poured into iced water and then extracted with ether. The ethereal solution is washed with water, sodium bicarbonate and dried over sodium sulfate. Evaporation of the solvent and chromatography of the residue on an acid-washed alumina column (300 g.) using ether-petroleum ether (v./v. 20–50%) as eluent gives the product, methyl-5-methoxy-2-methyl-3-indenyl-α-fluoroacetate.

The above product is then used in the procedure of Example 8 to give 1-p-chlorobenzylidene-2-methyl-5-methoxy-3-indenyl-α-fluoroacetic acid.

EXAMPLE 37

*1-p-chlorobenzylidene-5-methoxy-2-methyl-3-indenyl-α-morpholinoacetic acid*

A solution of methyl-5-methoxy-2-methyl-3-indenyl-α-tosyloxy acetate (0.01 mole) and morpholine (0.03 mole) in 50 ml. 1,2-dimethoxyethane is heated under reflux for 4–8 hours under nitrogen. The mixture is concentrated to one-third volume, diluted with water and extracted with ether. The ethereal solution is washed with water and dried over sodium sulfate. Evaporation of the solution and chromatography of the residue on a column of 100 g. neutral alumina using ether-petroleum ether (v./v. 50–100%) as eluent gives the product, methyl-5-methoxy-2-methyl-3-indenyl-α-morpholino acetate.

The above product is then used in the procedure of Example 8 to give 1 - p - chlorobenzylidene - 2 - methyl-5-methoxy-3-indenyl-α-morpholinoacetic acid.

EXAMPLE 38

*α-[1-p-chlorobenzylidene-2-methyl-5-methoxy-3-indenyl]-α-benzylthioacetic acid*

The procedure of Example 38 is followed, using 0.05 mole of benzylmercaptan in place of the 0.03 mole of morpholine, in the first step, to yield α-(1-p-chlorobenzylidene - 2 - methyl - 5-methoxy - 3 - indenyl) α - benzylthioacetic acid.

EXAMPLE 39

*1-p-chlorobenzylidene-2-methyl-5-methoxy-3-indenyl-α-fluoromethylacetic acid*

The procedure of Example 2 is followed using ethyl-α-bromo-β-fluoropropionate in place of ethylbromo acetate to produce ethyl-2-methyl-5-methoxy-3-indenyl-α-fluoromethyl acetate. This is then used in the procedure of Example 8 to produce 1-p-chlorobenzylidene-2-methyl-5-methoxy-α-fluoromethylacetic acid.

EXAMPLE 40

*1-p-chlorobenzylidene-2-fluoromethyl-5-methoxy-3-indenylacetic acid*

The procedure of Example 1 is followed, using ethyl-α-bromo-β-fluoropropionate in place of ethyl-2-bromopropionate to give 6-methoxy-2-fluoromethylindanone. This is then used in the procedure of Example 2 to give ethyl-2-fluoromethyl-5-methoxy-3-indenyl acetate which, when used in the procedure of Example 8, gives 1-p-chlorobenzylidene - 2 - fluoromethyl - 5 - methoxy - 3 - indenylacetic acid.

EXAMPLE 41

*α-(1-p-chlorobenzylidene-2,6-dimethyl-3-indenyl)glycine*

(A) *Ethyl - 2,6 - dimethyl - 3 - indenyl - α - acetamido acetate.*—The product of Example 30A is stirred in pyridine with an excess of acetic anhydride. The mixture is drowned in water and the product, ethyl-2,6-dimethyl-3-indenyl-α-acetamido acetate, is extracted with ether. The extracts are washed with dilute HCl and then to neutral with water. The extract is dried over $Na_2SO_4$ and evaporated.

(B) *1 - p - chlorobenzylidene - 2,6 - dimethyl - 3 - indenyl-α-acetamidoacetic acid.*—The product of Part A is used in the procedure of Example 8 to yield the above-named compound.

(C) *α - (1 - p - chlorobenzylidene - 2,6 - dimethyl - 3-indenyl)glycine.*—The product of Part B is heated on a steam bath in 2N NaOH solution for six hours. The mixture is cooled and neutralized to pH 6.5 with dilute HCl to yield the above-named amino acid.

EXAMPLE 42

*1-p-chlorobenzylidene-2-methyl-5-methoxy-3-indenyl-α-alkylacetic acid*

(A) *1 - p - chlorobenzylidene-2-methyl-5-methoxy-3-indenylacetamide.*—The procedure of Example 18 is followered using an ether solution of ammonia in place of the morpholine, to yield the above amide.

(B) *1 - p - chorobenzylidene-2-methyl-5-methoxy-3-indenyl acetonitrile.*—A mixture of 10 g. of the amide from Part A and 20 cc. of $POCl_3$ is heated at 90–100° for 4–5 hours.. The mixture is then poured into ice water and extracted with 100 ml. of ether. The extract is washed with sodium bicarbonate, dried over $Na_2SO_4$ and evaporated, to yield the above nitrile.

(C) *1 - p - chlorobenzylidene-2-methyl-5-methoxy-3-indenyl-α-allylacetonitrile.*—A mixture of 0.01 mole of the nitrile from Part B and 0.01 mole of $NaNH_2$ in toluene (100 cc.) is stirred at room temperature. Allyl chloride (0.015 mole) is added and the mixture is stirred for 3–4 hours. It is then poured into a large volume of water and extracted with ether. The extract is dried and evaporated to dryness, to yield the α-allyl nitrile.

(D) *1 - p - chlorobenzylidene-2-methyl-5-methoxy-3-indenyl-α-allylacetic acid.*—The α-allyl nitrile from Example 43C is refluxed 8 hours in a large volume of 6 N sulfuric acid. The mixture is then cooled, diluted with four to five volumes of water and extracted with ether. The extract is dried and evaporated to dryness to yield the α-allylacetic acid.

EXAMPLE 43

*α-(1-p-chlorobenzylidene-2,6-dimethyl-3-indenyl) acrylic acid*

(A) *Ethyl - α-(2,6-dimethyl-3-indenyl)acrylic acid.*—A mixture of one mole of ethyl-2,6-dimethyl-3-indenyl glyoxalate (cf. Example 30A) and one mole of triphenylphosphonium methylene $[(C_6H_5)P=CH_2]$ is stirred two hours at room temperature and then two hours at reflux. The mixture is drowned in a large volume of water and the benzene layer is separated and dried. Evaporation of the benzene leaves as a residue ethyl-α-(2,6-dimethyl-3-indenyl) acrylic acid.

(B) α - (1-p-chlorobenzylidene - 2,6-dimethyl - 3-indenyl)acrylic acid.—The product of Example 44A is used in the procedure of Example 8 to produce α-(1-p-chlorobenzylidene-2,6-dimethyl-3-indenyl)acrylic acid.

EXAMPLE 44

(A) 1 - p - chlorobenzylidene-2-methyl-5-nitro-3-indenylacetic acid.—The product of Example 7A is used in the procedure of Example 8 to produce 1-p-chlorobenzylidene-2-methyl-5-nitro-3-indenylacetic acid.

(B) 1 - p - chlorobenzylidene-2-methyl-5-amino-3-indenylacetic acid.—The product of Part A (one mole) is added gradually to a refluxing 10% solution of sodium sulfide (sufficient to provide over 10 mole proportion). The mixture is refluxed for several hours and cooled. It is then cautiously acidified until $H_2S$ has eased to evolve and the mixture is acid to Congo red paper. The residue is filtered, washed neutral with water and slurried in dilute aqueous sodium bicarbonate solution. This slurry is filtered and the filtrate is acidified. The precipitate, 1-p-chlorobenzylidene-2-methyl-5-amino-3-indenylacetic acid, is isolated by filtration, washed and dried.

(C) 1 - p - chlorobenzylidene-2-methyl-5-acetylamino-3-indenylacetic acid.—A mixture of 5 g. of the product of Part B, 5 g. of acetic anhydride and 50 ml. of pyridine is heated to reflux until no substantial test for free amine can be obtained on an aliquot. The mixture is then evaporated to dryness in vacuo to yield 1-p-chlorobenzylidene - 2 - methyl - 5-acetylamino-3-indenyl acetic acid. When other acid anhydrides such as propionic anhydride, butyric anhydride, or acid chlorides such as benzoylchloride are used in place of acetic anhydride, the corresponding 5-acylamino compound is obtained.

(D) 1 - p - chlorobenzylidene-2-methyl-5-methylamino-3-indenylacetic acid.—A mixture of 0.1 mole of the product of Part C, 0.1 mole of sodium hydride and 100 ml. of dimethylformamide is stirred at room temperature while 0.15 mole of methyliodide is added. The mixture is stirred until the reaction is substantially complete and then is added to 200 ml. of cold water. After excess NaOH solution is added, the mixture is refluxed until deacylation is substantially complete. Acidification of the mixture gives a precipitate of 1-chlorobenzylidene-2-methyl-5-methylamino-3-indenylacetic acid.

(E) 1 - p - chlorobenzylidene - 2-methyl-5-cyano-3-indenylacetic acid.—The product of Example 45B is dissolved in twenty times its weight of 5 N HCl and slightly over one mole proportion of sodium nitrile is added gradually at 0–5° C. The mixture is then stirred until diazotization is complete. The mixture is then poured, with stirring, into a slurry of cuprous cyanide in water containing excess sodium carbonate, the solution being kept alkaline by the addition of more $Na_2CO_3$ as needed. The mixture is then filtered and the filtrate is acidified. The precipitated product is filtered, dried and recrystallized from petroleum ether and ether to give 1-p-chlorobenzylidene-2-methyl-5-cyano-3-indenylacetic acid.

(F) 1 - p - chlorobenzylidene-2-methyl-5-carboxamido-3-indenyl-acetic acid.—The product of Part E is stirred at room temperature with concentrated sulfuric acid until hydrolysis is substantially complete. The product is isolated by drowning in water. It is the above-named carboxamido compound.

(G) 1-p-chlorobenzylidene-2-methyl-5-carboxy - 3 - indenyl-acetic acid.—The product of Part F is refluxed in 5 N NaOH until hydrolysis is substantially complete. Acidification of the mixture precipitates the above named product. When this product is stirred at ambient temperature in methanol, ethanol, propanol or butanol, in the presence of a small amount of sulfuric acid, the corresponding methyl, ethyl, propyl or butyl ester is formed, as e.g., 1-p-chlorobenzylidene-2-methyl-5-carbomethoxy-3-indenyl-acetic acid methyl ester.

EXAMPLE 45

1-p-chlorobenzylidene-2-methyl-5-methylthio-3-indenyl acetic acid

The procedure of Example 1 is followed substituting p-methylthiobenzaldehyde for p-anisaldehyde, to give ethyl-2-hydroxy-2-(p - methylthiophenyl) - 1 - methylpropionate and from this 6-methylthio-2-methylindanone. This product is then used in the procedure of Example 2 to give ethyl-5-methylthio - 2 - methyl - 3 - indenylacetate, which, when used in the procedure of Example 8, gives 1-p-chlorobenzylidene-2-methyl-5-methylthio-3 - indenylacetic acid.

When, in the above procedure, 4-methyl-sulfonylbenzaldehyde, 4-dimethylsulfamylbenzaldehyde, 4-dimethylaminoethylbenzaldehyde, 4 - phenylsulfonylbenzaldehyde, 4 - benzyloxybenzaldehyde, 4 - phenoxybenzaldehyde or 4 - cyclohexylbenzaldehyde is used in place of methylthiobenzaldehyde, there is obtained the corresponding 5-methylsulfonyl, 5-dimethylsulfamyl, 5 - dimethylaminoethyl, 5-phenylsulfonyl, 5-benzyloxy, 5-phenoxy and 5-cyclohexyl indene compounds.

When the 5-methylthio compound prepared above is used in the procedure of Example 14, the corresponding 5-mercapto compound is formed.

EXAMPLE 46

1-p-chlorobenzylidene-2-methyl-5-allyloxy-3-indenylacetic acid

A mixture of 0.1 mole of 1-p-chlorobenzylidene-2-methyl-5-hydroxy-3-indenylacetic acid, 500 ml. of acetone, 0.2 mole of $K_2CO_3$ and 0.15 mole of allyl chloride is refluxed overnight. The mixture is then drowned in a large amount of water and after acidification, extracted with ether. The ether extract is dried and evaporated to yield the 5-allyloxy compound.

When cyclopentylbromide is used in place of the allylbromide, the corresponding 5-cyclopentyloxy compound is obtained.

EXAMPLE 47

1-p-chlorobenzylidene-2-methyl-5-vinyl-3-indenyl-acetic acid

A mixture of 1-p-chlorobenzylidene-2-methyl-5-dimethylaminoethyl-3-indenylacetic acid (Example 46), molar excess of methyliodide and ethanol is heated until quaternization is complete. Evaporation to dryness in vacuo yields the residue consisting of the 5-trimethylammonium ethyl iodide salt. This salt is then dissolved in 2 N NaOH and the mixture is heated four hours on a steam bath. The mixture is then cooled and acidified. The precipitated 1-chlorobenzylidene-2-methyl-5-vinyl - 3 - indenyl-acetic acid is filtered and dried.

We claim:

1. A compound of the structure:

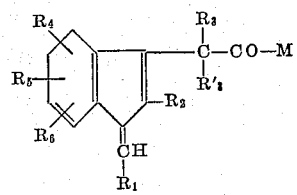

in which $R_1$ is aryl or heterocyclic aromatic radical;

$R_2$ is alkyl, phenyl lower alkyl, phenyl, thienyl halogen, hydroxy, alkoxy, haloalkyl, alkylthio and phenylthio;

$R_3$ is hydrogen, lower alkyl, haloloweralkyl, fluorine, amino, acylamino, N-morpholino, dialkylamino, alkenyl, aralkylthio, hydroxy, alkoxy and together with $R'_3$ a methylene;

$R'_3$ is hydrogen or together with $R_3$ a methylene;

$R_4$ is alkyl, alkoxy, nitro, amino, acylamino, alkylamino, dialkylamino, dialkylaminoalkyl, sulfamyl, alkylthio, mercapto, alkylsulfonyl, arylsulfonyl, halogen, cyano, carboxyl, carbalkoxy, carbamido, aryl, halogenoalkyl, alkenyloxy, aralkyloxy, alkenyl, aryloxy, cycloalkyl and cycloalkyloxy;

$R_5$ and $R_6$ are hydrogen or any of the groups defining $R_4$; and M is hydroxy, lower alkoxy, substituted lower alkoxy, amino, alkylamino, dialkylamino, N-morpholino, hydroxyalkylamino, polyhydroxyalkylamino, dialkyl aminoalkylamino, aminoalkylamino, and the group OMe, in which Me is a cation.

2. α-(1-p-chlorobenzylidenyl-2-methyl-5 - methoxy - 3-indenyl)-acetic acid.

3. α-(1-p-methylthiobenzylidenyl-2-methyl - 5 - methoxy-3-indenyl)-propionic acid.

4. α-(1-p-chlorobenzylidenyl-2-methyl-5 - methoxy - 3-indenyl)-propionic acid.

5. α-(1-p-methylthiobenzylidenyl-2-methyl - 5 - methoxy-3-indenyl)-acetic acid.

6. α-(1-p-chlorobenzylidenyl-2 - methyl - 5 - dimethylamino-3-indenyl)-acetic acid.

7. α-(1-p-trifluoromethylbenzylidenyl - 2 - methyl - 5-methoxy-3-indenyl)-propionic acid.

8. α-(1-p-chlorobenzylidenyl - 2 - methyl - 5 - fluoro-3-indenyl)-acetic acid.

9. α-(1-p-bromobenzylidenyl-2-methyl-5 - methoxy - 3-indenyl)-acetic acid.

10. α-(1-p-chlorobenzylidenyl-2-methyl - 5 - methoxy-3-indenyl)-acetic acid-β-diethylaminoethyl ester.

References Cited by the Examiner
UNITED STATES PATENTS

| | | | |
|---|---|---|---|
| 3,080,419 | 3/1963 | Horeau et al. | 260—515 |
| 3,114,768 | 12/1963 | Fritz | 260—515 |

LORRAINE A. WEINBERGER, *Primary Examiner.*

S. B. WILLIAMS, *Assistant Examiner.*